3,085,827
GLARE SHIELD
Carl O. Cederberg and Carl A. Cederberg, both of 510 61st Ave. N., Minneapolis, Minn.
Filed Aug. 17, 1961, Ser. No. 132,122
6 Claims. (Cl. 296—97)

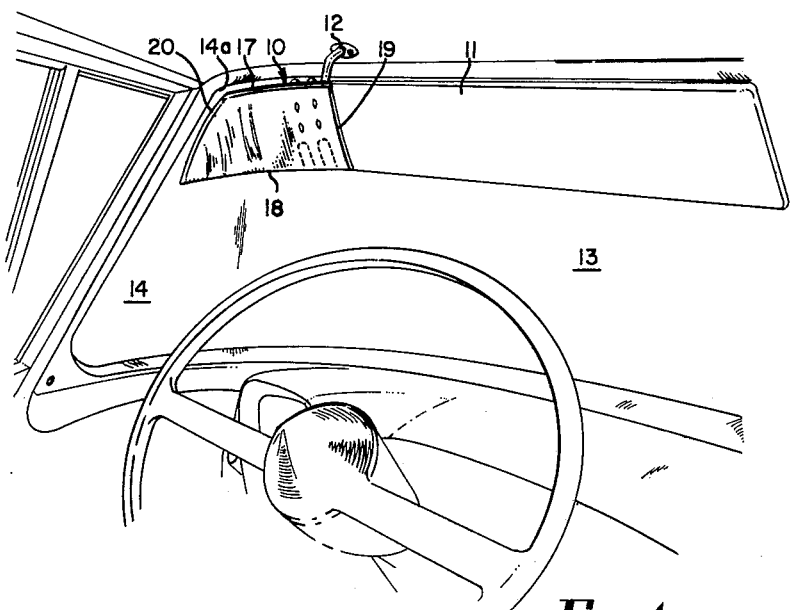
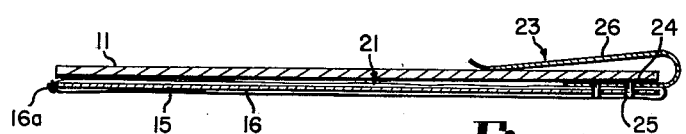
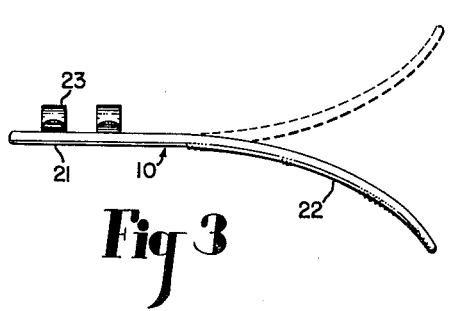

This invention relates to a glare shield for automotive vehicles and most particularly to a glare shield attachment for preventing side glare in automotive vehicles having wrap-around windshields.

An object of this invention is to provide a novel glare shield attachment of simple and inexpensive construction for use in preventing side glare in automotive vehicles of the type having wrap-around windshields.

Another object of this invention is the provision of a novel and improved glare shield attachment having means to permit ready connection thereof to the conventional automobile glare shield, to project therefrom and to conform generally to the wrap-around portion of conventional wrap-around windshields, to thereby prevent side glare in automotive vehicles of the type having the wrap-around windshields.

A further object of this invention is the provision of a novel and improved interchangeable glade shield attachment attachable to the conventional automobile glare shield for preventing side glare in automobiles having wrap-around type windshields, the glare shield attachment being constructed of readily deformable rigid material, which when deformed will retain its shape, and being bendable to conform to the wrap-around portion of the windshield on either side thereof, thereby permitting the glare shield attachment to be readily interchangeable for selective use on either side of the automobile.

These and other objects and advantages of this invention will more fully appear from the following description made in connection with the accompanying drawings, wherein like reference characters refer to the same or similar parts throughout the several views, and in which:

FIG. 1 is a fragmentary interior perspective view of an automotive vehicle incorporating our invention;

FIG. 2 is a transverse cross sectional view on an enlarged scale of our invention; and FIG. 3 is a top edge elevational view of our invention, and being illustrated in an adjusted position by a dotted line configuration.

Referring now to the drawing, and more particularly to FIG. 1, it will be seen that one embodiment of our novel glare shield attachment, designated in its entirety by the reference numeral 10, is there shown. It will be seen that our novel glare shield attachment 10 is shown attached to the conventional automobile glare shield 11, the latter being shiftably mounted by a mounting arm 12 for movement between a position of use, as illustrated in FIG. 1, and an out-of-the-way position wherein the glare shield will be disposed adjacent the inner surface of the car top. It will also be noted that the vehicle illustrated in FIG. 1 is of the type having the wrap-around windshield 13, which includes a wrap-around portion 14.

Referring now to FIG. 2 it will be seen that our novel glare shield attachment includes a backing sheet 15, which is constructed of a deformable material, such as soft aluminum or the like. A backing sheet formed of soft aluminum not only permits the sheet to be readily deformed to conform to the structures having curved contours but will retain its shape when it is deformed. The backing sheet will therefore be cut from a blank of soft aluminum material, or the like, and will have a substantially straight upper edge 17 and a substantially straight lower edge 18, disposed in substantially parallel relation. It will also be noted that the inner edge 19 of the blank, illustrated in FIG. 1, will also be disposed substantially normal to the upper and lower edges. The outer edge 20 is arcuately shaped to conform generally to the periphery 14a of the wrap-around curved portion 14 of the windshield 13. It will be seen that the width of the glare shield attachment 10 corresponds generally to the width of the glare shield 11 so that when the glare shield attachment is attached to the glare shield 11, the upper and lower edges 17 and 18 are co-extensive with the upper and lower edges respectively of the automobile glare shield 11.

It will also be seen that our novel glare shield attachment includes a flexible waterproof cover 16, which is preferably formed from a waterproof flexible plastic material, such as one of the polyvinyl plastics, or the like. The plastic cover may be attached to the backing sheet 15 with any suitable adhesive, or the backing sheet may be dipped in a plastic bath to form the cover. The plastic may have a suitable pigment in it so that the color of the attachment will be identical with the glare shield 11, or may be of other colors. The flexible waterproof cover not only serves to present an ornamental appearance to the glare shield attachment, but also covers any sharp projecting edges to thereby preclude damage to any portion of the interior of the vehicle with which the shield may come in contact.

Referring now to FIG. 3, it will be seen that our glare shield attachment is bent to define a planar portion 21 and a curved portion 22, the latter corresponding generally to the curved contour of the wrap-around portion 14 of the windshield 13. It will also be noted that when the backing sheet 15 is deformed, the outer peripheral edge of the curved portion 22, defined by the upper edge 17 and the outer arcuate edge 18, is disposed in close proximity and corresponds in shape to the peripheral edge portion 14a of the wrap-around portion of the windshield 13. It is further pointed out that the backing sheet blank may be bent prior to the application of the flexible plastic, although it may be bent afterwards.

Means are provided for detachably securing the glare shield attachment 10 to the conventional automobile glare shield 11 and this means includes a pair of attachment clips 23, as best seen in FIG. 2. It is pointed out that each of the clips 23 is constructed of spring metal and each includes an inner arm 24, which is detachably secured to one side of the glare shield 10 by means of rivets 25. Each of the clips 23 also includes an outer arm 26, the inner and outer arms 24 and 26 cooperating with each other to permit a portion of the conventional automobile glare shield 11 to be clipped therebetween, as clearly shown in FIG. 2.

When in use the glare shield 10 will be clipped to the conventional automobile glare shield 11 so that the glare shield projects laterally from one side thereof. When so attached to the main glare shield 11 at least a part of the planar portion 21 will be disposed in overlapped relation with the outermost part of the main glare shield 11 so that the curved portion 22 of the glare shield lies in close proximity to and in substantially concentric relation with the curved wrap-around portion 14 of the windshield 13. With this arrangement the curved portion 21 shields an occupant against the rays of light entering the curved portions of the windshield. It will be seen that the spring clip securing means permits the glare shield attachment to be readily removed from the main glare shield if it is desirable to so remove the attachment.

Referring again to FIG. 3, it will be seen that the readily deformable characteristic of the backing sheet along with the flexible property of the cover, permits the glare shield to be adjusted by deformation for use on either side of the automobile. In this connection it will be noted that the dotted line configuration illustrates how the glare shield may be deformed to oppositely bend the curved portion 22 so that the glare shield may be readily attached to the main glare shield 11 on the right side of the automobile. Thus it will be seen that our novel glare shield is so arranged and constructed that it is readily interchangeable for use at opposite sides of the automobile. It will also be seen that the rebending of the glare shield 10 may be accomplished without any danger of the user cutting or otherwise lacerating himself on the edges of the backing sheet 15 because of the smoothly contoured outline of the edges 16a, as best seen in FIG. 2, of the flexible waterproof cover 16.

The attachment 10 may also be deformed to substantially planar configuration for use in other attachment positions with the main glare shield 11.

As an alternative form of the invention, a rectangular frame may be used as a backing member rather than a continuous sheet of material. This frame will be constructed of readily deformable material such as aluminum and will retain its shape when deformed. The central portion of the frame in this embodiment would be filled with a suitable somewhat flexible plastic preferably opaque and would be bendable upon deformation of the frame member.

It will also be seen that we have provided a novel glare shield attachment which is attachable to the main glare shield in automobiles and which effectively serves to eliminate side glare in automobiles having the conventional wrap-around type windshield.

It will be noted from the foregoing description that our novel glare shield attachment is constructed of a backing sheet of a readily deformable material having a water resistant cover which is readily bendable to permit use on opposite sides of the automobile.

Thus it will be seen that we have provided a novel glare shield attachment which is not only of simple and inexpensive construction but which functions in a more efficient manner than any heretofore known comparable devices.

It will, of course, be understood that various changes may be made in the form, details, arrangement and proportions of the various parts without departing from the general scope of our invention.

What is claimed is:

1. A glare shield attachment connectible to the conventional automobile glare shield for use in preventing side glare in automobiles of the type having wrap-around windshields, said glare shield attachment including a backing sheet constructed of rigid readily deformable material, which when deformed will retain its shape and being of a width corresponding to the width of the conventional glare shield, said backing sheet being bent to define a planar portion and a curved portion, the latter being curved to conform generally to the rearwardly curved upper wrap-around portion of the conventional wrap-around windshield at one side thereof, a flexible cover for said backing sheet, readily releasable attachment means on said glare shield attachment for permitting said attachment to be detachably connected to the conventional automobile glare shield at one side of the automobile to at least dispose a part of said planar portion in overlapped relation with the outermost side portion of the conventional automobile glare shield, and said curved portion of said glare shield attachment projecting outwardly from the automobile glare shield when said attachment is attached thereto, to lie in close concentric relation to the upper curved wrap-around portion of the wrap-around windshield at one side thereof.

2. The structure as defined in claim 1, wherein said cover is constructed of a waterproof resistant plastic material.

3. The structure as defined in claim 1, wherein said readily releasable attachment means comprises a plurality of spring clips affixed to said planar portion.

4. A glare shield attachment connectible to the conventional automobile glare shield for use in preventing side glare in automobiles of the type having wrap-around windshields, said glare shield attachment including a backing sheet constructed of rigid readily deformable material, which when deformed will retain its shape, said backing sheet being bent to define a planar portion and a curved portion, the latter being curved to conform generally to the rearwardly curved upper wrap-around portion of the conventional wrap-around windshield at one side thereof, a flexible cover for said backing sheet, readily releasable attachment means on said glare shield attachment for permitting said attachment to be detachably connected to the conventional automobile glare shield at one side of the automobile to dispose at least a part of said planar portion in overlapped relation with the outermost side portion of the conventional automobile glare shield, and said curved portion of said glare shield attachment projecting outwardly from the conventional automobile glare shield when said attachment is attached thereto, to lie in close concentric relation to the upper wrap-around portion of the wrap-around windshield at one side thereof, and said glare shield attachment being readily bendable to permit said curved portion to be oppositely bent to conform generally to the upper rearwardly curved wrap-around portion of the wrap-around windshield at the other side of the automobile, whereby said glare shield is selectively adjustable and interchangeable for use at opposite sides of the automobile to prevent side glare therein.

5. The structure as defined in claim 4, wherein the peripheral edges of the curved portion corresponds generally to the rearwardly curved upper peripheral edge portion of the wrap-around windshield.

6. A glare shield attachment connectible to the conventional automobile glare shield for use in preventing side glare in automobiles of the type having wrap-around windshields, said glare shield attachment including a body portion constructed of a flexible material being of original planar shape and being of a width corresponding to the width of the conventional automobile glare shield to which it is attached, said body portion having at least a part thereof deformed to fit the wrap-around contour of a conventional wrap-around windshield, and readily releasable attachment means on said glare shield attachment for permitting said attachment to be detachably connected to the conventional automobile glare shield at one side of the automobile to at least dispose one part of the body portion in overlapped relation with the outermost side portion of the conventional automobile glare shield, and to dispose the deformed part thereof to lie in close concentric relation to the curved wrap-around portion of the wrap-around windshield at one side thereof.

References Cited in the file of this patent

UNITED STATES PATENTS

| | | |
|---|---|---|
| 1,898,276 | Van Dresser | Feb. 21, 1933 |
| 2,252,716 | Levy | Aug. 19, 1941 |
| 2,776,859 | Delano | Jan. 8, 1957 |
| 2,844,200 | Herr et al. | July 22, 1958 |
| 2,862,762 | McCormick | Dec. 2, 1958 |

FOREIGN PATENTS

| | | |
|---|---|---|
| 634,997 | France | Dec. 10, 1927 |
| 764,955 | Great Britain | Jan. 2, 1957 |